(12) United States Patent
Rhynard et al.

(10) Patent No.: US 12,275,519 B2
(45) Date of Patent: Apr. 15, 2025

(54) VERTICAL INTERCOSTAL STRUCTURE FOR LATERAL SUPPORT IN AIRCRAFT INTERIOR

(71) Applicant: The Boeing Company, Chicago, IL (US)

(72) Inventors: Steven Ellis Rhynard, Mukilteo, WA (US); Joe Files, Arlington, WA (US); Jason Empleo, Everett, WA (US); Kenneth M. Reynolds, Everett, WA (US)

(73) Assignee: The Boeing Company, Chicago, IL (US)

( * ) Notice: Subject to any disclaimer, the term of this patent is extended or adjusted under 35 U.S.C. 154(b) by 70 days.

(21) Appl. No.: 17/804,861

(22) Filed: Jun. 1, 2022

(65) Prior Publication Data
US 2023/0391440 A1 Dec. 7, 2023

(51) Int. Cl.
*B64C 1/06* (2006.01)

(52) U.S. Cl.
CPC .................................... *B64C 1/066* (2013.01)

(58) Field of Classification Search
CPC ............................. B64D 11/003; B64C 1/066
See application file for complete search history.

(56) References Cited

U.S. PATENT DOCUMENTS

| | | | |
|---|---|---|---|
| 5,201,831 A | 4/1993 | Higgins et al. | |
| 5,549,258 A | 8/1996 | Hart et al. | |
| 7,461,816 B2 | 12/2008 | Schwartz et al. | |
| 8,226,033 B2 | 7/2012 | Koefinger et al. | |
| 8,528,859 B2 | 9/2013 | Gross et al. | |
| 9,010,686 B2 | 4/2015 | Saint-Jalmes et al. | |
| 9,758,233 B2 | 9/2017 | King et al. | |
| 10,179,638 B2 * | 1/2019 | King | B64D 11/00 |
| 10,371,313 B2 * | 8/2019 | McIntosh | F16F 9/303 |
| 10,399,658 B2 * | 9/2019 | Von-Wilmowsky | B64C 25/34 |
| 10,577,110 B2 * | 3/2020 | McIntosh | B29C 63/0017 |
| 10,611,453 B2 | 4/2020 | Kauffman et al. | |
| 11,480,207 B2 * | 10/2022 | Files | B64C 1/10 |
| 2003/0042359 A1 | 3/2003 | Lambiaso | |
| 2018/0229844 A1 | 8/2018 | White et al. | |
| 2019/0135406 A1 | 5/2019 | Bischof | |
| 2020/0362595 A1 * | 11/2020 | Files | E05F 3/20 |
| 2020/0381911 A1 | 12/2020 | Harleman et al. | |
| 2020/0391867 A1 | 12/2020 | Pangalila | |

FOREIGN PATENT DOCUMENTS

| | | | | |
|---|---|---|---|---|
| DE | 102011084722 A1 * | 4/2013 | ........... | B64D 11/003 |
| EP | 2590859 B1 | 7/2010 | | |

* cited by examiner

*Primary Examiner* — Joshua J Michener
*Assistant Examiner* — Ryan Andrew Yankey
(74) *Attorney, Agent, or Firm* — Joseph M. Butscher; The Small Patent Law Group LLC (57) ABSTRACT

A vertical intercostal for an aircraft vehicle having a vehicle cabin and an over-monument fairing arranged in a non-flex zone area of the vehicle cabin. The intercostal includes a frame member that includes an upper frame attachment region, a lower frame attachment region, and an intermediate frame attachment region to provide lateral structural support for the over-monument fairing to the airframe of the aircraft.

20 Claims, 8 Drawing Sheets

FIG. 9 ated at the arcuate frame member portion, and the intermediate frame attachment region is arranged at a transition area between the upper attachment region and the lower attachment region.

VERTICAL INTERCOSTAL STRUCTURE FOR LATERAL SUPPORT IN AIRCRAFT INTERIOR

FIELD

One or more embodiments relate generally to a vertical intercostal structure operable to provide lateral support in an interior cabin of an aircraft vehicle.

BACKGROUND

Over-monument fairings (OMFs) are generally mounted in standard flex zones of internal cabin areas of an air frame. In particular, OMFs are mounted above full-height monuments to continue the appearance of a stow bin run to facilitate any lighting, communication, and/or valance interfaces to continue in areas above the monuments. In such standard flex zones, P4-type clevis fittings are generally used to enable structural support of the OMFs. Should a design configuration require mounting of an OMF outside of a standard flex zone, P4-type clevis fittings are unavailable on the air frame. It is also costly to modify primary structural interfaces for custom fittings that are needed on specific design configurations.

SUMMARY

In one or more exemplary embodiments, a vertical intercostal structure is provided for an aircraft having an airframe, and is operable for attachment between a secondary support rail and a lower clevis primary aircraft frame fitting structure to facilitate use of lateral supports for over-monument fairings or other interior components in non-flex-zone regions of an aircraft cabin interior where typical clevis fittings support from primary structure are unavailable.

In one or more exemplary embodiments, the example vertical intercostal structure comprises a frame member that includes an upper frame attachment region, a lower frame attachment region, and an intermediate frame attachment region to provide lateral structural support for an over-monument fairing arranged in a non-flex zone area of the airframe.

In accordance with the example vertical intercostal structure, the upper frame attachment region comprises opposed upper flange members defining an attachment opening. The attachment opening is operable to receive a secondary support bracket that facilitates attachment of the frame member to a secondary support structure which vertically supports the over-monument fairing within the aircraft cabin.

In accordance with the example vertical intercostal structure, the lower frame attachment region comprises opposed lower flange members defining a lower clevis mount that facilitates attachment of the frame member to the airframe. The lower clevis mount is operable to receive a connection member such as, for example, a tie-rod that facilitates attachment of the frame member to the airframe.

In accordance with the example vertical intercostal structure, the intermediate frame attachment region comprises spaced apart intermediate flange members defining an intermediate clevis mount that facilitates the attachment of the frame member to the over-monument fairing. The intermediate clevis mount is operable to receive a horizontal intercostal structure that facilitates attachment of the frame member to the over-monument fairing.

In accordance with the example vertical intercostal structure, the frame member comprises a linear frame member portion extending from an arcuate frame member portion. The upper frame attachment region is arranged at the linear frame member portion, the lower frame attachment region is arranged at the arcuate frame member portion, and the intermediate frame attachment region is arranged at a transition area between the upper attachment region and the lower attachment region.

In one or more exemplary embodiments, an example aircraft, comprises: an airframe defining a vehicle cabin; an over-monument fairing arranged in a non-flex zone area of the vehicle cabin; a support member to provide vertical structural support for the over-monument fairing; and a vertical intercostal structure including a frame member having an upper frame attachment region for attachment to the support member, a lower frame attachment region for attachment to the airframe, and an intermediate frame attachment region for attachment to the over-monument fairing to provide lateral structural support therefor.

In accordance with the example aircraft, the upper frame attachment region comprises opposed upper flange members defining an attachment opening. The attachment opening is operable to receive a secondary support bracket that facilitates attachment of the frame member to a secondary support structure which vertically supports the over-monument fairing within the aircraft cabin.

In accordance with the example aircraft, the lower frame attachment region comprises opposed lower flange members defining a lower clevis mount that facilitates attachment of the frame member to the airframe. The lower clevis mount is operable to receive a connection member such as, for example, a tie-rod that facilitates attachment of the frame member to the airframe.

In accordance with the example aircraft, the intermediate frame attachment region comprises spaced apart intermediate flange members defining an intermediate clevis mount that facilitates the attachment of the frame member to the over-monument fairing. The intermediate clevis mount is operable to receive a horizontal intercostal structure that facilitates attachment of the frame member to the over-monument fairing.

In accordance with the example aircraft, the frame member comprises a linear frame member portion extending from an arcuate frame member portion. The upper frame attachment region is arranged at the linear frame member portion, the lower frame attachment region is arranged at the arcuate frame member portion, and the intermediate frame attachment region is arranged at a transition area between the upper attachment region and the lower attachment region.

In one or more exemplary embodiments, an example method of manufacturing an aircraft having an airframe is provided, the method comprising: mounting an over-monument fairing in a non-flex zone of the airframe; and laterally supporting the over-monument fairing to the airframe via a vertical intercostal structure.

In accordance with the example method, the method further comprises vertically supporting the over-monument fairing via a secondary support member.

In accordance with the example method, laterally supporting the over-monument fairing comprises: attaching an upper frame attachment region of a frame member of the vertical intercostal structure to the secondary support structure; and attaching a lower frame attachment region of the frame member of the vertical intercostal structure to the airframe.

In accordance with the example method, laterally supporting the over-monument fairing comprises attaching an intermediate frame attachment region of a frame member of the vertical intercostal structure to the over-monument fairing.

The features, functions, and advantages that have been discussed can be achieved independently in various embodiments or may be combined in yet other embodiments further details of which can be seen with reference to the following description and drawings.

DRAWINGS

The various advantages of the examples of the present disclosure will become apparent to one skilled in the art by reading the following specification and appended claims, and by referencing the following drawings, in which:

DESCRIPTION

A flex zone is an area or region of an aircraft interior where interior configuration flexibility concepts are utilized. These usually occur at or near doorways, since this is where airline operators generally choose to locate galleys, lavatories, etc. For each airframe, there are defined flex zones that are specific to each commodity. For example, a galley flex zone may differ from a partition flex zone, which may differ from a lavatory flex zone, etc.

Within the flex zone regions, it is required that the structure and/or provisions be present to accommodate various positions and in-service relocation of these monuments. Outside of the flex zone regions, i.e., in non-flex zone regions, the requirement for capability and provisions is not necessarily present. Consequently, when a structural air frame configuration (e.g., at request of a customer) requires an unconventional monument arrangement, the provisions must be added. This disclosure provides a technical solution to such a structural air frame configuration.

A vertical intercostal, a vehicle, and a method of manufacturing a vehicle are provided herein to facilitate lateral structural support of an OMF when mounted outside of a standard flex zone of the air frame. As illustrated and/or described herein, such structural support is provided without modifying the basic and stable primary structure of the air frame.

As illustrated and/or described herein, a vertical intercostal facilitates use of a tie-rod mount at a P4-type connection point at an area of the vehicle cabin that is outside of the standard flex zone where P4 connections are generally unavailable. Outside of the standard flex zone, a secondary support rail is used to provide vertical structural support to the OMF. Because the only other attachment to the primary structure available in the area is P3-type clevis fittings that are located on the airframe through-out the airplane. These P3-type clevis fittings are generally used for lower stowage bin attachments, but are not used in areas where a monument is installed.

As illustrated and/or described herein, a vertical intercostal is spatially arranged and mounted between a secondary support rail at an upper frame attachment region thereof and a horizontal intercostal attached to a P3-type clevis fitting at a lower frame attachment region thereof. Such a spatial configuration facilitates use of a horizontally-oriented attachment member (e.g., a tie-rod) to be attached at one end thereof to the OMF and an opposite end thereof to the vertical intercostal in a manner that provides lateral support to the OMF at an area of the vehicle cabin located outside of the standard flex zone.

A mere addition of a rigid vertical structural member between the secondary support rail and P3-type clevis fitting would be problematic insofar as the airframe flexes in response flight loads, thermal expansion, pressurization, etc. The rigid vertical structural member would connect at link two places along the curved airframe with a rigid attachment, and thus, would cause stress on the clevis fittings that would likely result in in flight-fracture as the airframe flexes.

In order to prevent such in flight-fracturing, the lower attachment region of the vertical intercostal disclosed and/or illustrated herein is attached to the airframe via a tie-rod having spherical end-fittings that accommodates flexing of the airframe. In essence, by not locking the two clevis fittings together, the structural configuration of the vertical intercostal forms a four-bar that accommodates loads associated with flexing of the airframe.

In the illustrated example of FIGS. 1 through 6, a vertical intercostal structure 10 for an aircraft is provided to facilitate lateral structural support of an OMF when mounted outside of a standard flex zone of an airframe of an aircraft having an airframe 21. Although the illustrated example embodiment is an aircraft, this disclosure contemplates the vertical intercostal structure 10 having applications in other vehicles that fall within the spirit and scope of the principles of this disclosure set forth herein. One such vehicle may comprise, for example, a spacecraft.

Figure 1:
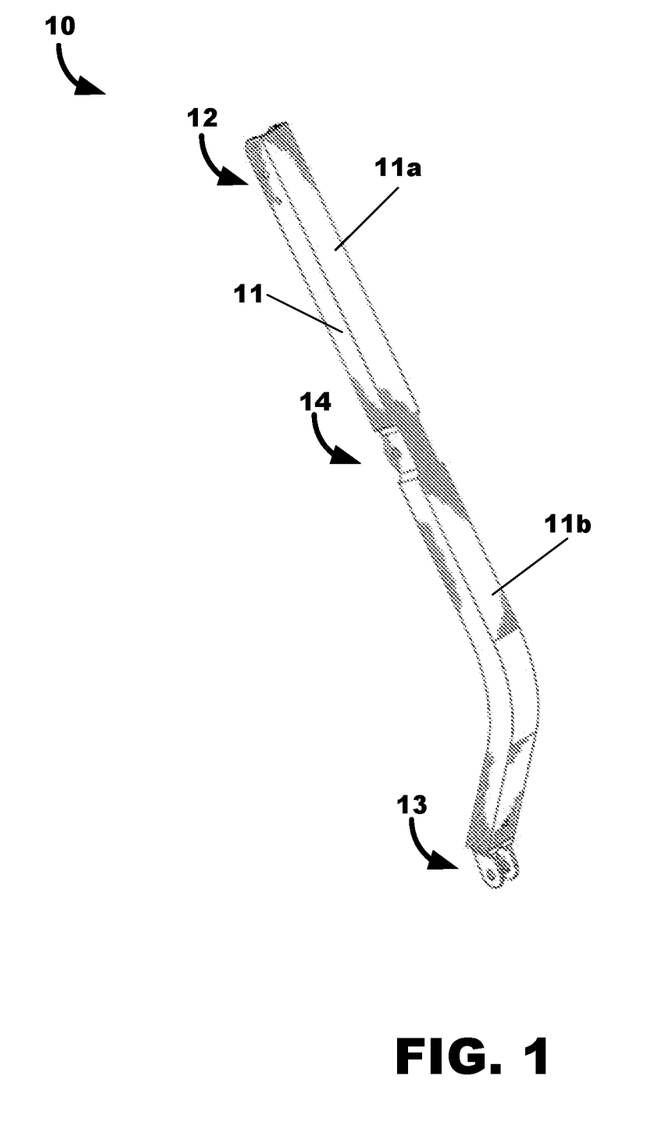
FIG. 1 illustrates a front perspective view of an advantageous embodiment of a vertical intercostal structure.
Figure 2:
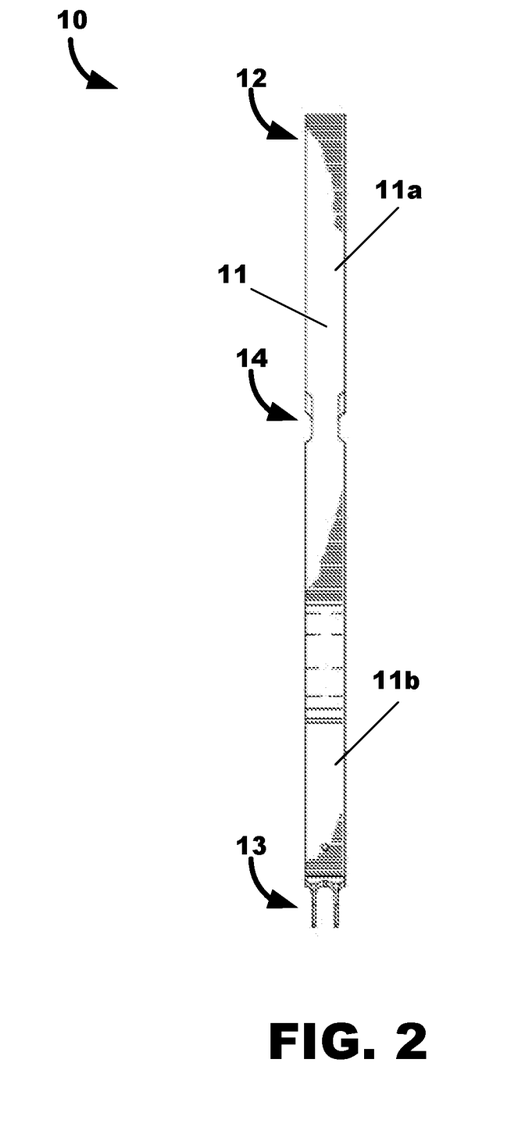
FIG. 2 illustrates a rear view of the vertical intercostal structure of FIG. 1.

In accordance with one or more embodiments, the vertical intercostal structure 10 comprises a frame member 11 having a structural configuration that forms a four-bar that accommodates loads associated with flexing of the airframe. In one or more exemplary embodiments, the frame member 11 is fabricated using a high-strength material capable of withstanding high loads. An exemplary material for fabricating the frame member 11 includes, but is not limited to, titanium. Such an example material disclosed herein, however, is not limited thereto. Thus, this disclosure contemplates fabricating the frame member 11 using any suitable material that falls within the spirit and scope of the principles of this disclosure set forth herein.

In the illustrated exemplary embodiment, the frame member 11 comprises a plurality of attachment regions that facilitate a connection between the frame member 11 and other structures within the cabin of the aircraft. Such attachment regions include, in a mounted position of the frame member 11, an upper frame attachment region 12 located at an upper region of the frame member 11, a lower frame attachment region 13 located spatially below the upper frame attachment region 12 at a lower region of the frame member 11, and an intermediate frame attachment region 14 located spatially between the upper frame attachment region 12 and the lower frame attachment region 13. The intermediate frame attachment region 14 is operable to provide lateral structural support for an OMF 20 arranged in a non-flex zone area of the airframe 21.

Figure 3:
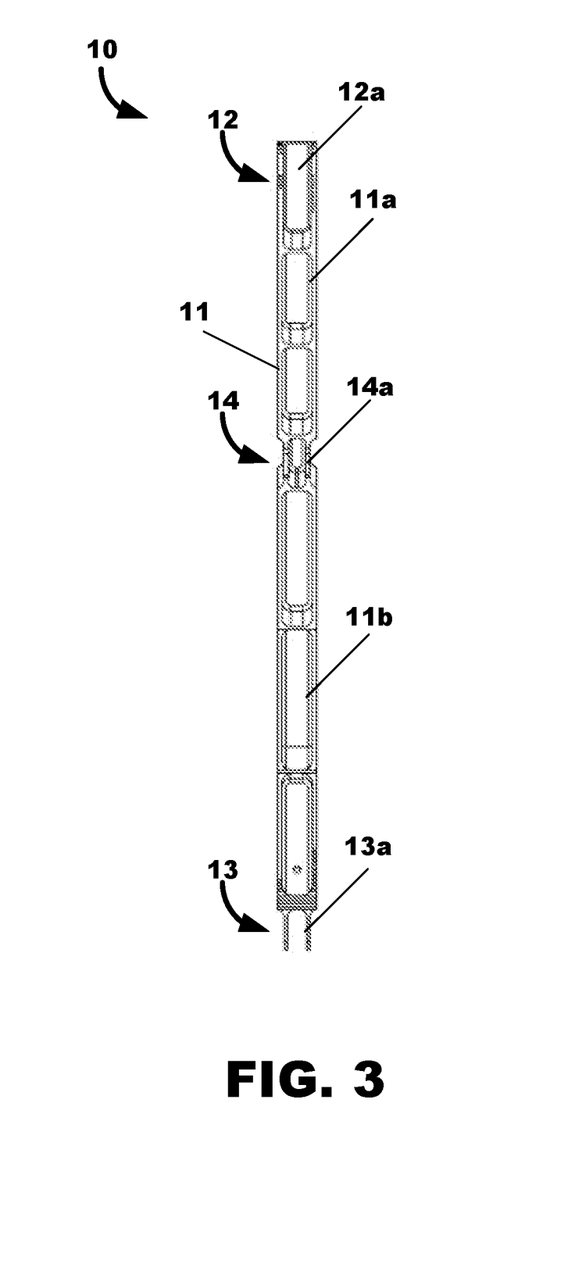
FIG. 3 illustrates a front view of the vertical intercostal structure of FIG. 1.
Figure 6:
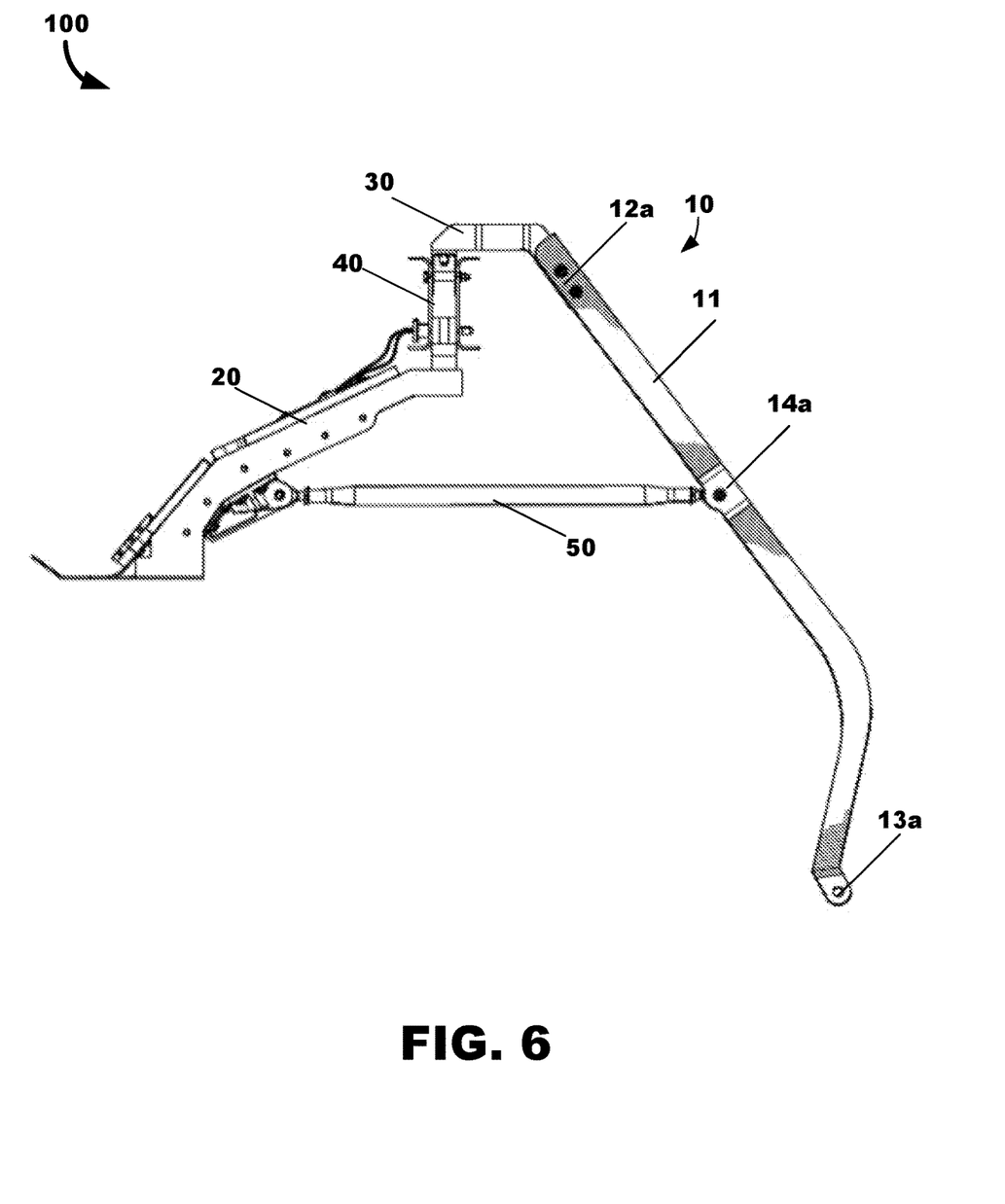
FIG. 6 illustrates a side view of an advantageous embodiment of a system for mounting an OFM in a vehicle cabin.
Figure 7:
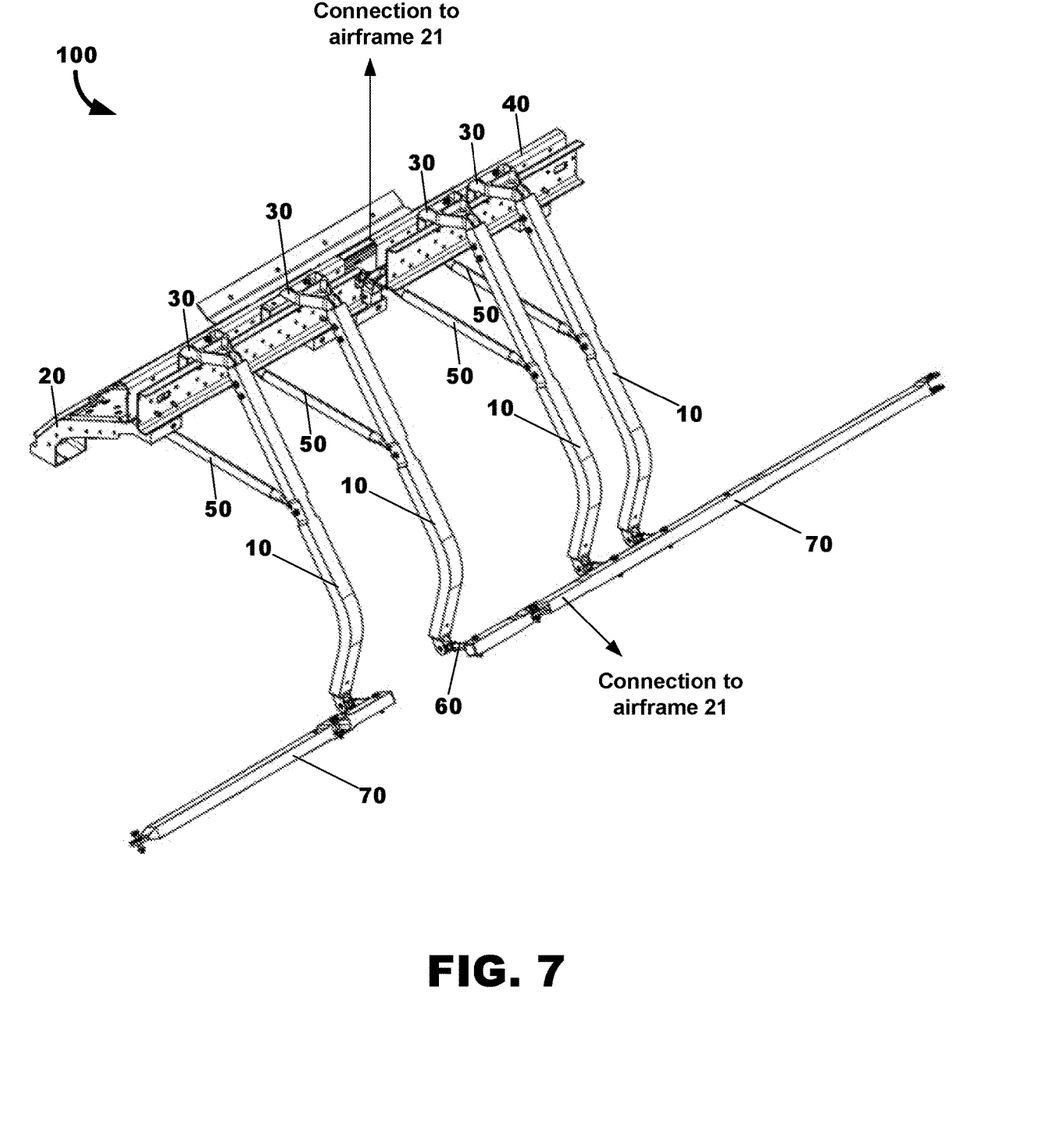
FIG. 7 illustrates a perspective view of an advantageous embodiment of a system for mounting an OFM in a vehicle cabin.

As illustrated in FIGS. 3, 6, and 7, the upper frame attachment region 12 comprises opposed upper flange members defining an attachment opening 12a to receive a secondary support bracket 30 that facilitates attachment of the frame member 11 to a secondary support structure 40 which vertically supports the OMF 20.

The lower frame attachment region 13 comprises opposed lower flange members defining a clevis mount 13a that facilitates attachment of the frame member 11 to the airframe 21. In an operating state of the vertical intercostal structure 10, the clevis mount 13a receives a tie-rod 60 that attaches the frame member 11 to the airframe via a lower horizontal intercostal structure 70 located adjacent to the lower frame attachment region 13. Such a structural configuration of the frame member 11 and connection architecture at the lower frame attachment region 13 thereof accommodates the flexing of the airframe during take-off, landing, and in-flight.

The intermediate frame attachment region 14 comprises spaced apart intermediate flange members defining a clevis mount 14a that facilitates attachment of the frame member 11 to the OMF 20. In particular, the clevis mount 14a facilitates connection of the frame member 11 to a horizontally-extending tie-rod 50, and thus, facilitates the lateral structural support of the OMF 20 when mounted outside of a standard flex zone of the airframe 21.

Figure 4:
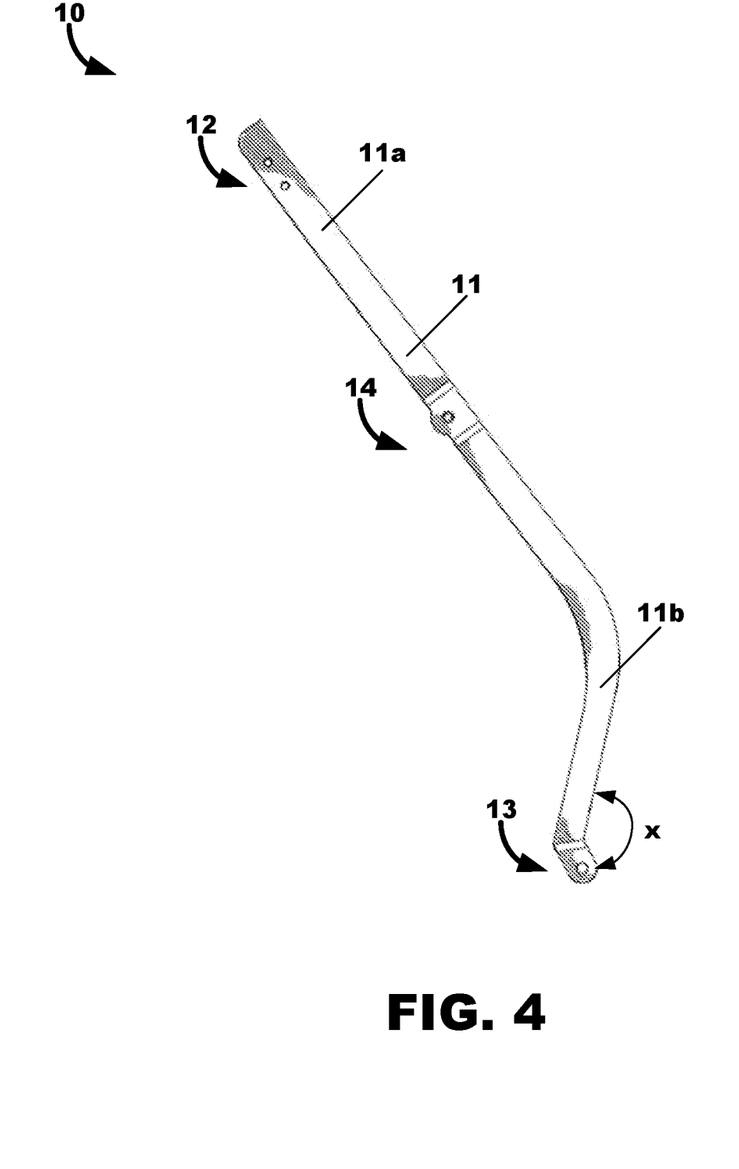
FIG. 4 illustrates a side view of the vertical intercostal structure of FIG. 1.
Figure 5:
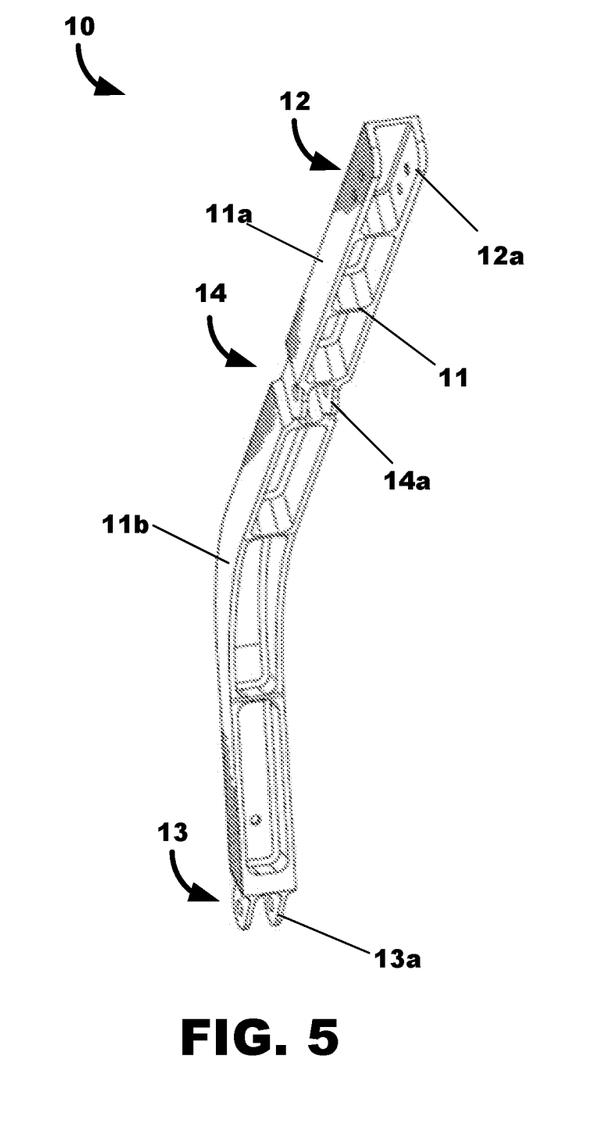
FIG. 5 illustrates a rear perspective view of the vertical intercostal structure of FIG. 1.

As illustrated in FIG. 4, the frame member 11 has a structural configuration that comprises a linear frame member portion 11a that extends from an arcuate frame member portion 11b. The upper frame attachment region 12 is arranged at the linear frame member portion, the lower frame attachment region 13 is arranged at the arcuate frame member portion, and the intermediate frame attachment region 14 is arranged at a transition area between the upper frame attachment region 12 and the lower frame attachment region 13.

As illustrated in FIGS. 6 and 7, an aircraft 100 comprises an airframe 21 defining a vehicle cabin, an OMF 20 arranged in a non-flex zone area of the vehicle cabin, a support member that comprises a secondary support rail which provides vertical structural support for the OMF 20, and the vertical intercostal structure 10 as set forth, disclosed, and/or illustrated herein.

Figure 8:
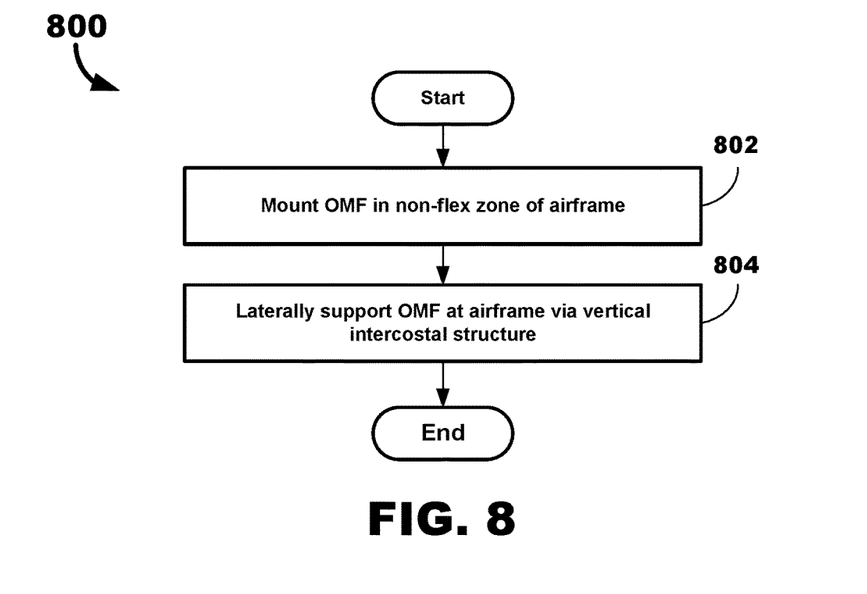
FIGS. 8 and 9 respectively illustrate an advantageous embodiment of a method of manufacturing an aircraft.
Figure 9:
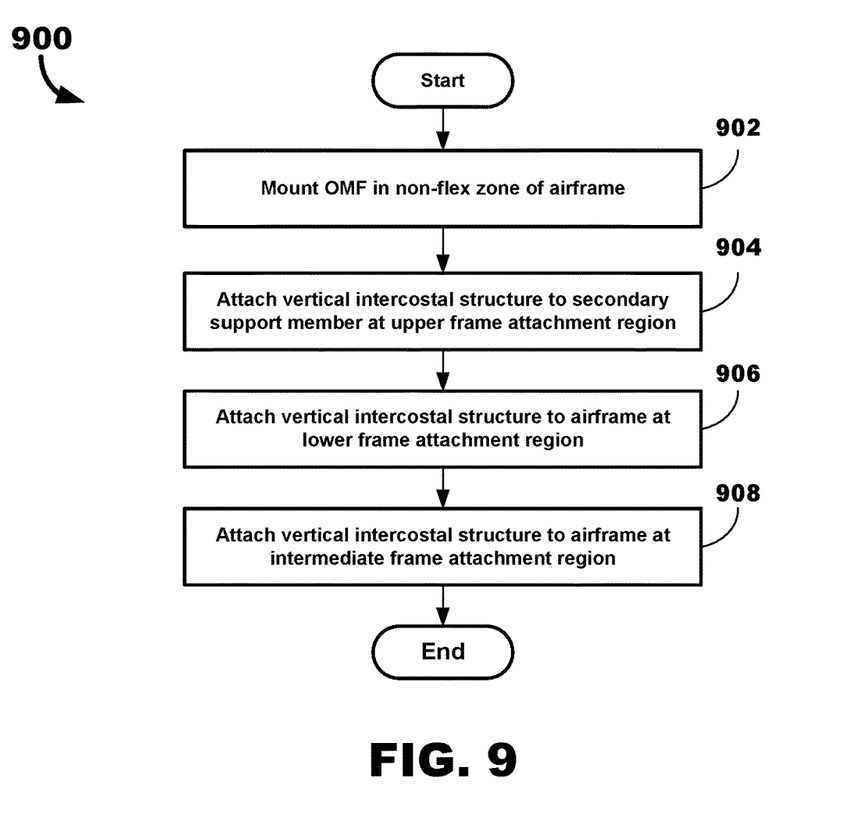

The illustrated example embodiments of FIGS. 8 and 9 respectively set forth a flowchart of a method 800, 900 for manufacturing an aircraft. In one or more example embodiments, the respective flowcharts of the methods 800 and 900 are manually-implemented, computer-implemented, or a combination thereof. In the computer-implemented method, one or more processors of a computing device may execute one or more process blocks set forth, described, and/or illustrated herein. For example, the one or more processors of the computing device are configured to implement the methods 800, 900 using logic instructions (e.g., software), configurable logic, fixed-functionality hardware logic, etc., or any combination thereof. In one or more example embodiments, software executed by the computing device provides functionality described or illustrated herein. In particular, software executing by the one or more processors of the computing device is operable to perform one or more processing blocks of the methods 800, 900 set forth, described, and/or illustrated herein, or provides functionality set forth, described, and/or illustrated.

In the illustrated example of FIG. 8, illustrated process block 802 includes mounting an OMF in a non-flex zone of an airframe of the aircraft.

The method 800 then proceeds to illustrated process block 804, which includes laterally supporting the OMF to the airframe via a vertical intercostal structure.

In accordance with process block 804, laterally supporting the OMF comprises attaching an upper frame attachment region of a frame member of the vertical intercostal structure to the secondary support structure.

In accordance with process block 804, laterally supporting the over-monument fairing comprises attaching a lower frame attachment region of the frame member of the vertical intercostal structure to the airframe.

In accordance with process block 804, laterally supporting the over-monument fairing comprises attaching an intermediate frame attachment region of a frame member of the vertical intercostal structure to the OMF.

The method 800 may terminate or end after execution of process block 804.

In the illustrated example of FIG. 9, illustrated process block 902 includes mounting an OMF in a non-flex zone of an airframe of the aircraft.

The method 900 then proceeds to illustrated process block 904, which includes attaching an upper frame attachment region of a frame member of the vertical intercostal structure to a secondary support structure which also vertical supports the OMF.

The method 900 then proceeds to illustrated process block 906, which includes attaching a lower frame attachment region of the frame member of the vertical intercostal structure to the airframe.

The method 900 then proceeds to illustrated process block 908, which includes attaching an intermediate frame attachment region of a frame member of the vertical intercostal structure to the over-monument fairing in a manner that laterally supports the OMF at the airframe.

The method 900 may terminate or end after execution of process block 908.

The terms "coupled," "attached," or "connected" used herein is to refer to any type of relationship, direct or indirect, between the components in question, and is to apply to electrical, mechanical, fluid, optical, electromagnetic, electromechanical, or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action is to occur, either in a direct or indirect manner.

Those skilled in the art will appreciate from the foregoing description that the broad techniques of the one or more embodiments of the present disclosure is to be implemented in a variety of forms. Therefore, while the present disclosure describes matters in connection with particular embodiments thereof, the true scope of the embodiments of the present disclosure should not be so limited since other modifications will become apparent to the skilled practitioner upon a study of the drawings, specification, and following claims.

What is claimed is:

1. A vertical intercostal structure for an aircraft having an airframe, the vertical intercostal structure-comprising:
   a frame member including:

an upper frame attachment region,
a lower frame attachment region, and
an intermediate frame attachment region to provide lateral structural support for an over-monument fairing arranged in the aircraft airframe;
the lower frame attachment region containing a pair of lower flange members, the lower flange members including a first clevis mount,
the intermediate frame attachment region comprising spaced apart intermediate flange members defining a second clevis mount that facilitates the attachment of the frame member to the over-monument fairing, wherein the second clevis mount receives an upper horizontal intercostal structure that facilitates attachment of the frame member to the over-monument fairing;
the upper frame attachment region comprising opposed upper flange members defining an attachment opening to receive a secondary support bracket that facilitates attachment of the frame member to a secondary support structure which vertically supports the over-monument fairing, and wherein each of the secondary support structure and the upper horizontal intercostal structure is directly affixed to the over-monument fairing; and
a tie rod having spherical end-fittings supported within the first clevis mount, the end-fittings configured for flexible securement of the vertical intercostal structure to a lower horizontal intercostal structure of the aircraft.

2. The vertical intercostal structure of claim 1, wherein one or more portions of the vertical intercostal structure are formed of titanium.

3. The vertical intercostal structure of claim 1, wherein the frame member comprises a linear frame member portion extending from an arcuate frame member portion.

4. The vertical intercostal structure of claim 3, wherein:
the upper frame attachment region is arranged at the linear frame member portion,
the lower frame attachment region is arranged at the arcuate frame member portion, and
the intermediate frame attachment region is arranged at a transition area between the upper attachment region and the lower attachment region.

5. An aircraft, comprising:
a lower horizontal intercostal structure;
an over-monument fairing;
a support member providing vertical structural support for the over-monument fairing; and
a vertical intercostal structure including a frame member having an upper frame attachment region secured to the support member, a lower frame attachment region, and an intermediate frame attachment region for attachment to the over-monument fairing,
wherein the lower frame attachment region contains a pair of lower flange members, the lower flange members including a first clevis mount;
the intermediate frame attachment region comprising spaced apart intermediate flange members defining a second clevis mount that facilitates the attachment of the frame member to the over-monument fairing, wherein the second clevis mount receives an upper horizontal intercostal structure that facilitates attachment of the frame member to the over-monument fairing;
the upper frame attachment region comprising opposed upper flange members defining an attachment opening to receive a secondary support bracket that facilitates attachment of the frame member to a secondary support structure which vertically supports the over-monument fairing, and wherein each of the secondary support structure and the upper horizontal intercostal structure is directly affixed to the over-monument fairing; and
a tie rod supported within the first clevis mount, the tie rod having spherical end fittings for flexibly securing the vertical intercostal structure to the lower horizontal intercostal structure.

6. The aircraft of claim 5, wherein one or more portions of the vertical intercostal structure are formed of titanium.

7. The aircraft of claim 5, wherein the frame member comprises a linear frame member portion extending from an arcuate frame member portion.

8. The aircraft of claim 7, wherein:
the upper frame attachment region is arranged at the linear frame member portion,
the lower frame attachment region is arranged at the arcuate frame member portion, and
the intermediate frame attachment region is arranged at a transition area between the upper attachment region and the lower attachment region.

9. A method of manufacturing an aircraft having an airframe, the aircraft comprising:
a lower horizontal intercostal structure;
an over-monument fairing;
a support member providing vertical structural support for the over-monument fairing; and
a vertical intercostal structure including a frame member having an upper frame attachment region secured to the support member, a lower frame attachment region, and an intermediate frame attachment region for attachment to the over-monument fairing,
wherein the lower frame attachment region contains a pair of lower flange members, the lower flange members including a first clevis mount;
the intermediate frame attachment region comprising spaced apart intermediate flange members defining a second clevis mount that facilitates the attachment of the frame member to the over-monument fairing, wherein the second clevis mount receives an upper horizontal intercostal structure that facilitates attachment of the frame member to the over-monument fairing;
the upper frame attachment region comprising opposed upper flange members defining an attachment opening to receive a secondary support bracket that facilitates attachment of the frame member to a secondary support structure which vertically supports the over-monument fairing, and wherein each of the secondary support structure and the upper horizontal intercostal structure is directly affixed to the over-monument fairing; and
a tie rod supported within the first clevis mount, the tie rod having spherical end fittings for flexibly securing the vertical intercostal structure to the lower horizontal intercostal structure,
the method comprising:
mounting the over-monument fairing in a non-flex zone of the airframe; and
laterally supporting the over-monument fairing to the airframe via the vertical intercostal structure.

10. The method of claim 9, further comprising vertically supporting the over-monument fairing via the secondary support member.

11. The method of claim 10, wherein laterally supporting the over-monument fairing comprises:

attaching the upper frame attachment region of the frame member of the vertical intercostal structure to the secondary support member; and attaching the lower frame attachment region of the frame member of the vertical intercostal structure to the airframe.

12. The method of claim 9, wherein laterally supporting the over-monument fairing comprises attaching the intermediate frame attachment region of the frame member of the vertical intercostal structure to the over-monument fairing.

13. The vertical intercostal structure of claim 1, wherein the upper horizontal intercostal structure comprises a second tie rod.

14. The aircraft of claim 5, wherein the upper horizontal intercostal structure comprises a second tie rod.

15. The method of claim 9, wherein the upper horizontal intercostal structure comprises a second tie rod.

16. The method of claim 9, wherein one or more portions of the vertical intercostal structure are formed of titanium.

17. The method of claim 9, wherein the frame member comprises a linear frame member portion extending from an arcuate frame member portion.

18. The method of claim 17, wherein the upper frame attachment region is arranged at the linear frame member portion.

19. The method of claim 17, wherein the lower frame attachment region is arranged at the arcuate frame member portion.

20. The method of claim 17, wherein the intermediate frame attachment region is arranged at a transition area between the upper attachment region and the lower attachment region.

* * * * *